(12) United States Patent
Kim et al.

(10) Patent No.: US 7,386,282 B2
(45) Date of Patent: Jun. 10, 2008

(54) PORTABLE COMMUNICATION APPARATUS

(75) Inventors: Jun Kim, Seoul (KR); Chang-Soo Lee, Incheon (KR); In-Gon Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 419 days.

(21) Appl. No.: 11/122,136

(22) Filed: May 4, 2005

(65) Prior Publication Data

US 2005/0277388 A1    Dec. 15, 2005

(30) Foreign Application Priority Data

Jun. 9, 2004    (KR)    ............... 10-2004-0042276

(51) Int. Cl.
*H04B 1/38*    (2006.01)
(52) U.S. Cl. ............... 455/90.3; 455/575.1; 455/575.3; 455/575.4; 455/347; 379/93.17
(58) Field of Classification Search ............... 455/90.3, 455/575.1, 575.3, 575.4, 347
See application file for complete search history.

(56) References Cited

U.S. PATENT DOCUMENTS

| | | | |
|---|---|---|---|
| 6,188,917 B1 * | 2/2001 | Laureanti | 455/573 |
| 6,292,980 B1 * | 9/2001 | Yi et al. | 16/303 |
| 6,484,016 B1 * | 11/2002 | Cheon | 455/90.1 |
| 6,704,417 B2 * | 3/2004 | Kim | 379/433.07 |
| 6,876,872 B2 * | 4/2005 | Ko | 455/572 |
| 7,034,755 B2 * | 4/2006 | Takagi | 343/702 |
| 7,106,357 B2 * | 9/2006 | Fukuda et al. | 348/14.02 |
| 7,123,945 B2 * | 10/2006 | Kokubo | 455/566 |
| 7,228,158 B2 * | 6/2007 | Lee et al. | 455/575.3 |

* cited by examiner

*Primary Examiner*—Marceau Milord
(74) *Attorney, Agent, or Firm*—The Farrell Law Firm, PC

(57) ABSTRACT

A portable communication apparatus including a first housing extending along a longitudinal direction, a second housing connected at substantially one end of the first housing, and a pair of link arms formed on the second housing facing each other, for connecting the second housing to the first housing allowing the second housing to rotate relative to the first housing so that a variety of electronic communication components may be mounted on the second housing, and rotation of the second housing facilitates convenient placement of the electronic component for use.

15 Claims, 9 Drawing Sheets

PORTABLE COMMUNICATION APPARATUS

PRIORITY

This application claims priority to an application entitled "Portable Communication Apparatus" filed with the Korean Intellectual Property Office on Jun. 9, 2004 and assigned Serial No. 2004-42276, the contents of which are hereby incorporated by reference.

BACKGROUND OF THE INVENTION

1. Field of the Invention

The present invention relates to a portable communication apparatus, and more particularly to a portable communication apparatus capable of easily adjusting the direction of additional function modules, including a camera lens module, a flash, and an IrDA (infrared data association) module.

2. Description of the Related Art

In general, portable communication apparatuses may be classified into various types depending on their appearance, such as bar-type portable communication apparatuses, flip-type portable communication apparatuses, and folder-type portable communication apparatuses. The bar-type portable communication apparatus has a single housing shaped like a bar. The flip-type portable communication apparatus has a flip which is pivotably mounted to a bar-shaped housing by a hinge device. The folder-type portable communication apparatus has a folder coupled to a single bar-shaped housing by a hinge device in such a manner that the folder can be rotated towards or unfolded away from the housing.

Further, portable communication apparatuses may be classified into rotation-type communication apparatuses, sliding-type communication apparatuses, and pop-up-type communication apparatuses depending on how it is opened or closed. In the rotation-type portable communication apparatus, two housings are coupled to each other to allow one housing to rotate open or closed relative to the other while facing each other. In the sliding-type and pop-up-type portable communication apparatuses, two housings are coupled to each other to allow one housing to slide along a longitudinal direction to be opened or closed relative to the other. These variously classified portable communication apparatuses can be easily understood by those skilled in the art.

Referring to FIG. 1, a conventional bar-type portable communication apparatus has a display device 14 and a key array portion 15 for data input, both of which are positioned on the front portion 11 thereof, as well as a speaker device 13 positioned on the upper end thereof. Referring to FIG. 2, the bar-type portable communication apparatus has a fixed camera lens module 16 on the rear portion 12 thereof.

As shown in FIGS. 1 and 2, the bar-type portable communication apparatus it is inconvenient to us in that it is difficult to adjust the direction of the camera lens module 16 because it is fixed. Accordingly, with this design it may be impossible for a user to view the display device 14 each time a picture is taken especially if the user is taking a picture of him/herself.

Meanwhile, current portable communication apparatuses tend to incorporate an increasing number of additional complex functions, such as a camera function, a flash function, and an IrDA function, in addition to the basic function of performing communication. As additional function modules are added to perform additional functions, the mounting space becomes limited. In addition, noise from the additional function modules may affect other electronic components, e.g., an antenna, which is mounted adjacently thereto.

SUMMARY OF THE INVENTION

Accordingly, the present invention has been made to solve the above-mentioned problems occurring in the prior art, and an object of the present invention is to provide a portable communication apparatus capable of easily adjusting the direction of additional function modules, including a camera lens module, a flash, and an IrDA module.

Another object of the present invention is to provide a portable communication apparatus wherein additional function modules are positioned in an additional housing, which is separate from existing housings, so that the noise from the additional function modules is less likely to affect an electronic device, e.g., an antenna, disposed on a main housing.

In order to accomplish this object, there is provided a portable communication apparatus which includes a first housing extending along a longitudinal direction; a second housing connected to an end of the first housing to allow rotation about a hinged axis; and a pair of link arms formed on the second housing facing each other, for connecting the second housing to the first housing to allow rotation of the second housing relative to the first housing.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description of the present invention, a detailed description of known functions and configurations incorporated herein will be omitted when it may make the subject matter of the present invention unclear.

A portable communication apparatus having additional function modules installed thereon, including a camera lens module 310, a flash 320, and an IrDA module 330, will now be described with reference to FIGS. 3 to 9.

Figure 1:
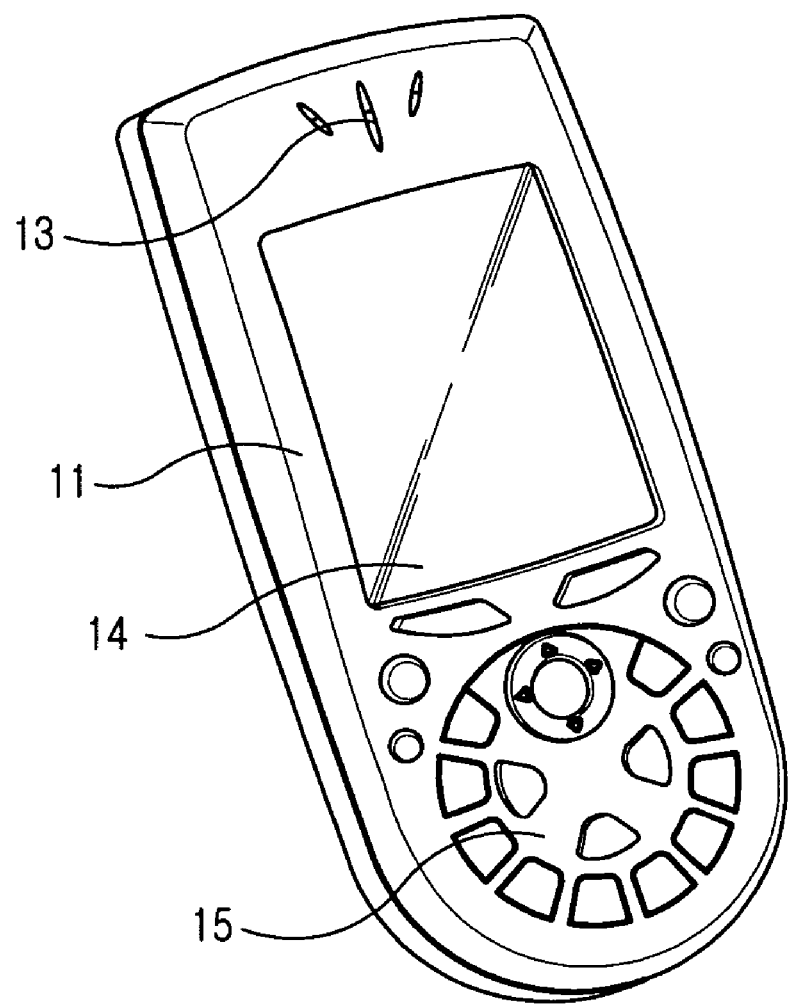
FIG. 1 is a perspective view showing a conventional bar-type portable communication apparatus.
Figure 2:
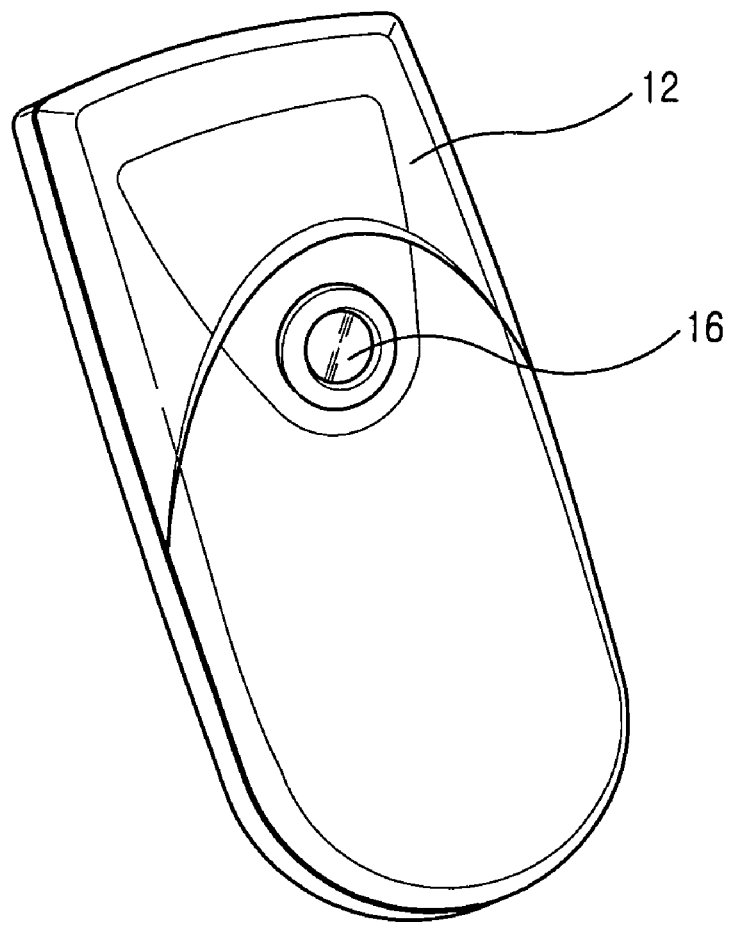
FIG. 2 is a perspective view showing the rear side of a conventional bar-type portable communication apparatus.
Figure 3:
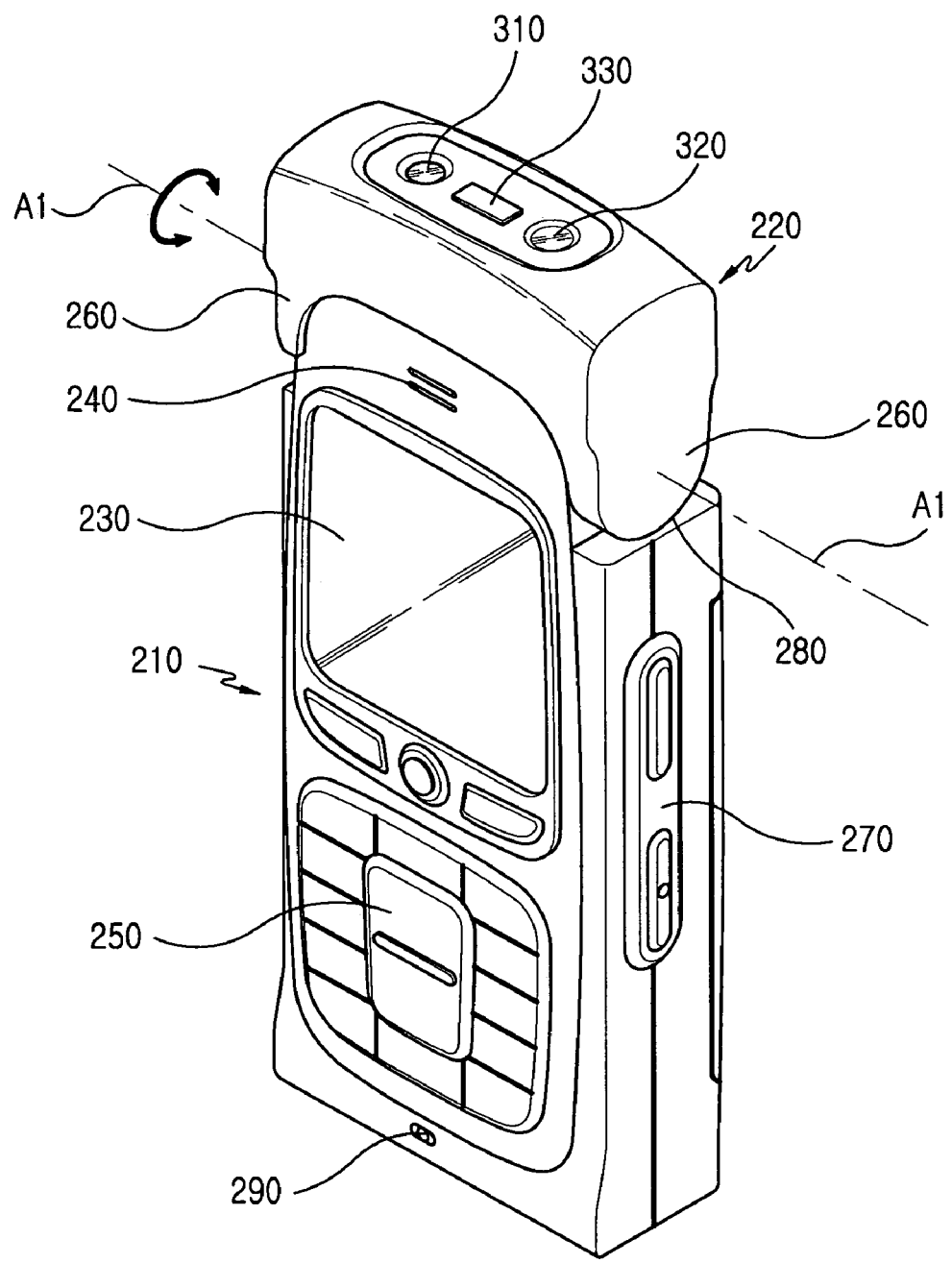
FIG. 3 is a perspective view showing a portable communication apparatus according to an embodiment of the present invention.

Referring to FIG. 3, a perspective view of a portable communication apparatus according to a preferred embodiment of the present invention is shown. The portable communication apparatus includes a first housing 210 as a main body, a second housing 220 connected to an end of the first housing 210 whereby it can be rotated about a hinge axis A1, and a pair of link arms 260 positioned on the second housing 220 facing each other, for rotatably connecting the second housing 220 to the first housing 210.

The link arms 260 have link arm terminals 280 having a predetermined curvature for smooth rotation in relation to the first housing 210.

The first housing 210 has a display device 230 for displaying data and a speaker device 240 disposed adjacently to the upper portion of the display device 230. The first housing 210 has a key array portion 250, which is composed of a number of keys, disposed adjacently to the lower portion of the display device 230, and a microphone device 290 disposed adjacently to the lower portion of the key array portion 250. The first housing 210 also has side key portions 270 positioned on both lateral surfaces thereof for, e.g., taking pictures using a camera and for adjusting the volume.

Figure 4:
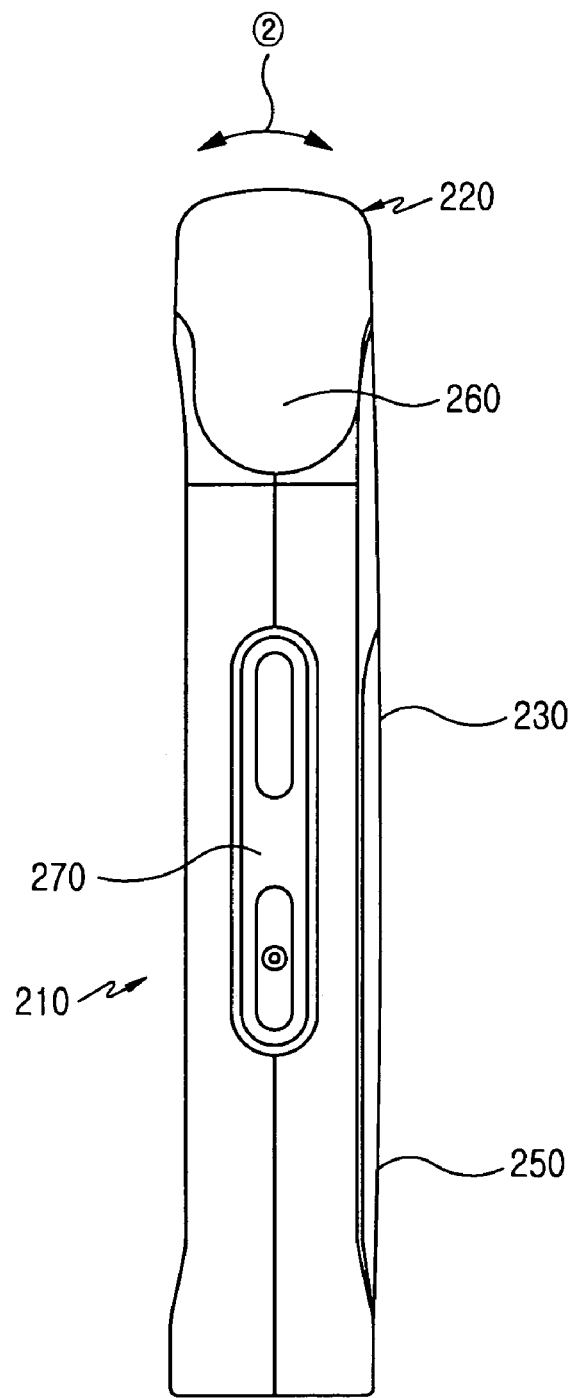
FIG. 4 is a side view showing a portable communication apparatus according to an embodiment of the present invention showing a direction of rotation of a second housing, where the second housing is in a first position.

Referring to FIG. 4, the second housing 220 is rotatable in either direction shown by arrow ②, which extends along the longitudinal direction of the first housing 210. In the first position shown in FIG. 4, the portable communication apparatus is ready to be used for speech mode function.

Figure 5:
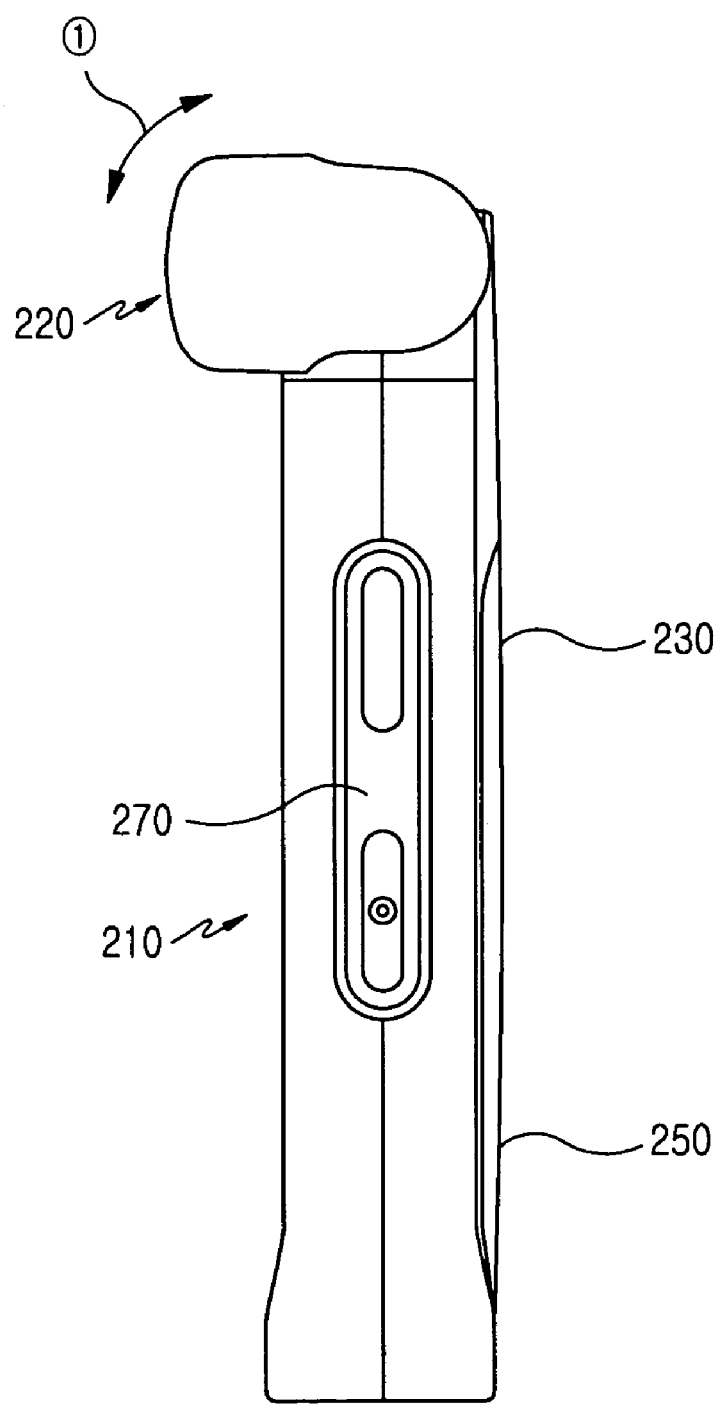
FIG. 5 is a side view showing a portable communication apparatus according to an embodiment of the present invention wherein a second housing is rotated in a first direction to a second position.

Referring to FIG. 5, the second housing 220 is directed toward a position after rotation shown by arrow ①, the second position being perpendicular to the longitudinal direction of the first housing 210 and which faces in the opposite direction of the display device 230. In this second position, the portable communication apparatus is ready to take pictures.

Figure 6:
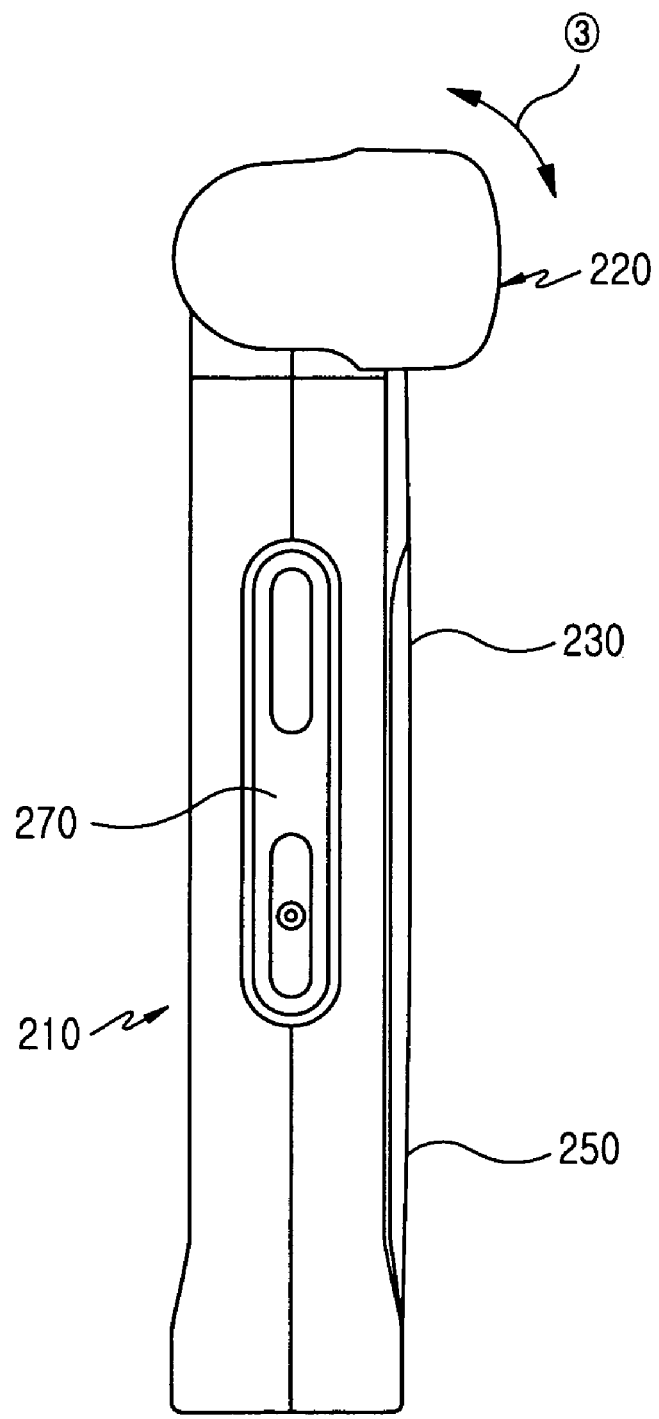
FIG. 6 is a side view showing a portable communication apparatus according to an embodiment of the present invention wherein a second housing is rotated in a second direction to a third position.

Referring to FIG. 6, the second housing 220 is directed toward a third position after rotation shown by arrow ③, the third position being perpendicular to the longitudinal direction of the first housing 210 and which faces in the same direction of the display device 230. In this state, the portable communication apparatus is ready to take pictures of the user himself/herself with the camera lens module 310 or to perform video communication.

Figure 7:
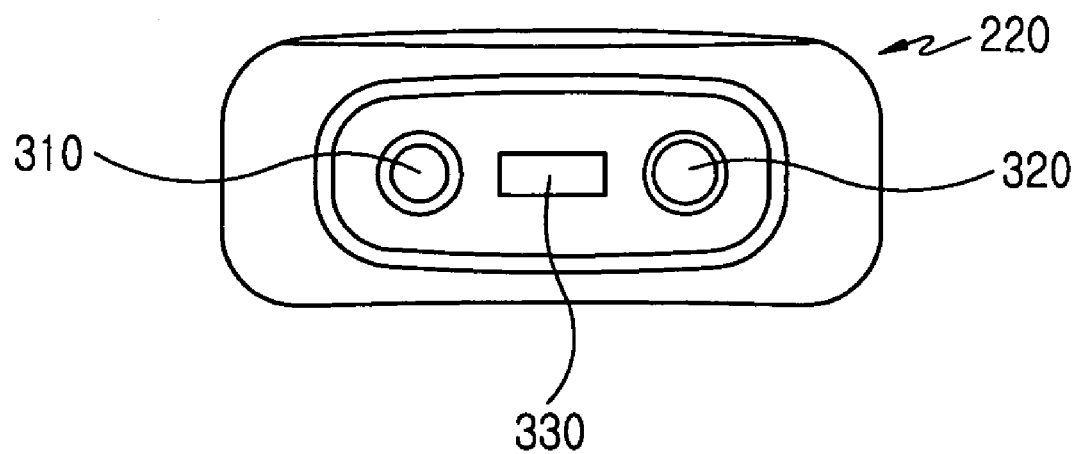
FIG. 7 is a top view showing the components of the second housing of a portable communication apparatus according to an embodiment of the present invention.

Referring to FIG. 7, a top view of the second housing 220 is shown. The second housing 220 has a camera lens module 310, a flash 320, and an IrDA module 330 for additional functions, in addition to the basic function of the portable communication apparatus of performing communication. Although not shown in the drawing, the second housing 220 may also have additional function modules.

Figure 8:
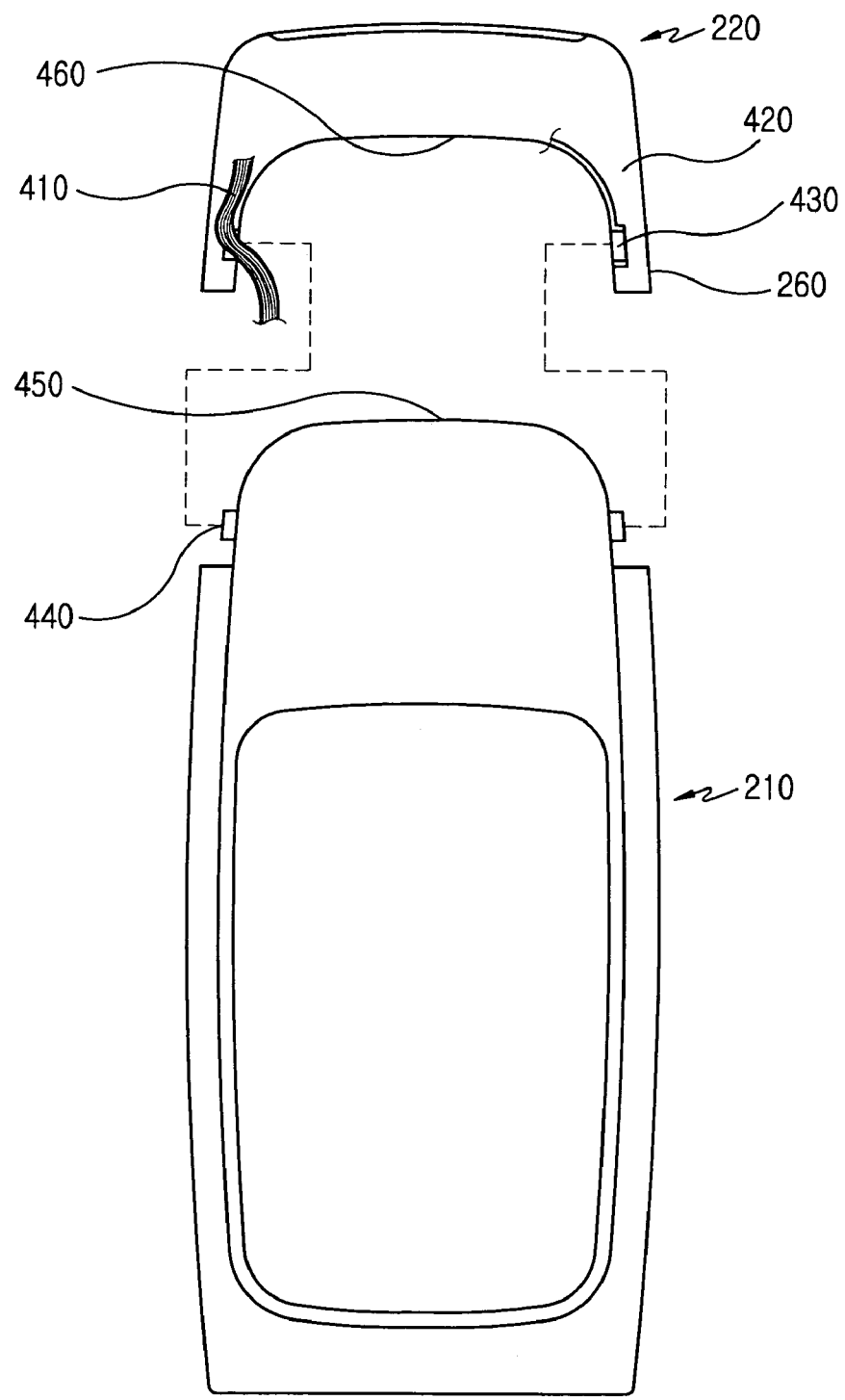
FIG. 8 is a rear view showing a portable communication apparatus according to an embodiment of the present invention wherein the first and second housings are separated from each other.

Referring to FIG. 8, a front view of the first and second housings 210 and 220, which are connected to each other, is shown. As shown, the portable communication apparatus is provided with a flexible circuit 410 for an electrical connection between the first and second housings 210 and 220, a link arm inner space 420 through which the flexible circuit 410 can pass, hinge protrusions 440 formed on the first housing 210, and hinge holes 430 formed in the link arm 260 to accommodate the hinge protrusion 440 to allow the second housing 220 to rotate about the hinge axis A1. The uppermost end surface 450 of the first housing and the bottom surface 460 of the second housing are adapted to face other with a predetermined curvature for smooth rotation. Specifically, the uppermost end surface 450 of the first housing has a convex shape, and the bottom surface 460 of the second housing is contoured to accommodate the convex shape of the uppermost end surface 450.

According to the above relationship, the second housing 220, which has the camera lens module 310, the flash 320, and the IrDA module 330 positioned thereon, can be rotated into the first, second, and third positions, by the user. The flexible circuit 410 permits rotation of the second housing 220 into the first, second, and third positions.

Figure 9:
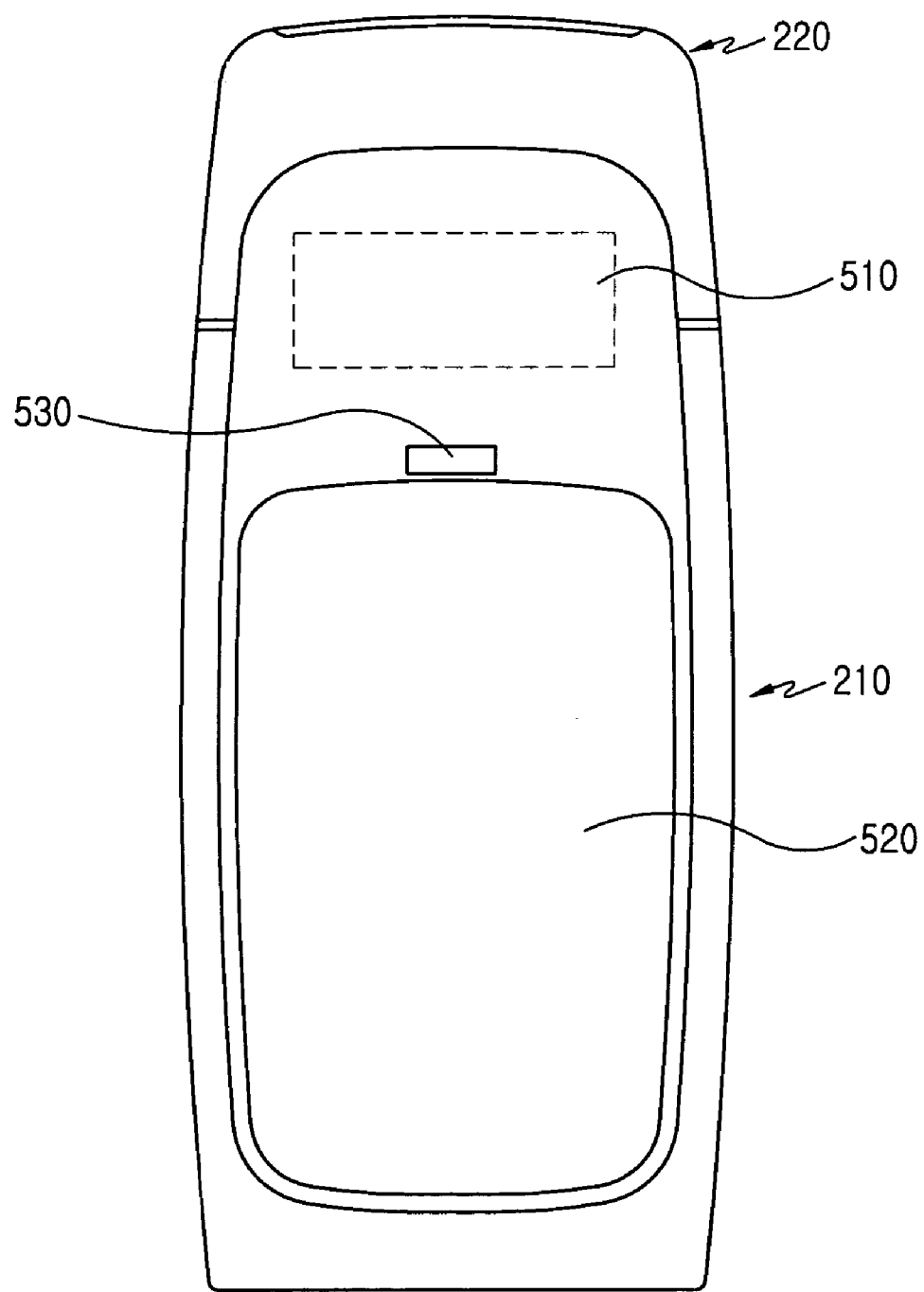
FIG. 9 is a rear view showing an embedded antenna of a portable communication apparatus according to an embodiment of the present invention.

Referring to FIG. 9, a rear view of the portable communication apparatus is shown. The portable communication apparatus has an embedded antenna 510, which is positioned inside the rear upper end of the first housing 210, a battery lock 530 and a battery pack 520, which are positioned adjacent to the lower portion of the embedded antenna 510.

As mentioned above, the portable communication apparatus according to the present invention has additional function modules, such as a camera lens module 310, a flash 320, and an IrDA module 330, positioned on the second housing, which is separate from the first housing. As a result, the additional function modules can be used extensively for additional functions. In addition, although the mounting structure of the portable communication apparatus has become increasingly complicated, noise from the additional function modules are less likely to affect an electronic components, such as an embedded antenna 510, of the first housing 210.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A portable communication apparatus comprising:
a first housing extending along a longitudinal axis;
a second housing connected to an end of the first housing; and
a pair of link arms formed on the second housing facing each other, for connecting the second housing to the first housing allowing the second housing to rotate in a first direction relative to the first housing from a first position parallel to the longitudinal axis of the first housing to a second position perpendicular to the longitudinal axis of the first housing, and in a second direction relative to the first housing, opposite the first direction, from the first position to a third position perpendicular to the longitudinal axis of the first housing.

2. A portable communication apparatus as claimed in claim 1, wherein the second housing is adapted to rotate between first, second, and third positions through a range of 180 degrees.

3. A portable communication apparatus as claimed in claim 1, wherein the second housing is provided with at least one of a camera lens module, a flash, and an IrDA module.

4. A portable communication apparatus as claimed in claim 1, wherein the first housing is provided with a display device.

5. A portable communication apparatus as claimed in claim 4, further comprising:
   a speaker device positioned adjacent to an upper portion of the display device;
   a key array portion having a number of keys, positioned adjacent to a lower portion of the display device; and
   a microphone device positioned adjacent to a lower portion of the key array portion.

6. A portable communication apparatus as claimed in claim 1, wherein the first housing has side key portions, including a plurality of keys positioned on at least one lateral surface thereof.

7. A portable communication apparatus as claimed in claim 1, wherein the pair of link arms have an inner space in which a flexible circuit is contained for electrically connecting the first and second housings to each other.

8. A portable communication apparatus as claimed in claim 1, wherein said portable communication apparatus is one of a bar-type apparatus and a flip-type apparatus.

9. A portable communication apparatus as claimed in claim 1, wherein the first housing is provided with an embedded antenna.

10. A portable communication apparatus as claimed in claim 1, wherein the link arms have terminals with a predetermined curvature.

11. A portable communication apparatus as claimed in claim 1, wherein an uppermost end surface of the first housing and a bottom surface of the second housing are adapted to face each other with a predetermined curvature.

12. A portable communication apparatus as claimed in claim 1, wherein the second housing is rotatable with respect to the first housing about a hinge axis which is perpendicular to the longitudinal axis.

13. A portable communication apparatus comprising:
   a first housing extending along a longitudinal axis;
   a second housing positioned on an end of the first housing, the second housing extending along the longitudinal axis, having a camera lens module mounted thereon, and connected to the first housing to allow rotation about a hinge axis; and
   a pair of link arms extending from the second housing while facing each other, the link arms being coupled to an end of the first housing, and forming the hinged axis connecting the second housing to the first housing allowing the second housing to be rotated in a first direction relative to the first housing from a first position parallel to the longitudinal axis of the first housing to a second position perpendicular to the longitudinal axis of the first housing, and in a second direction relative to the first housing. opposite the first direction, from the first position to a third position perpendicular to the longitudinal axis of the first housing.

14. A portable communication apparatus as claimed in claim 13, wherein the rotation of the second housing facilitates taking pictures of objects when the second housing is rotated to the second position, facilitating a speech mode function when rotated to the first position, and facilitating picture taking of the user with the camera lens module and performing video communication functions when rotated to the third position.

15. A portable communication apparatus comprising:
   a first housing extending along a longitudinal axis;
   a second housing connected at one end of the first housing; and
   a pair of link arms formed on the second housing facing each other, for connecting the second housing to the first housing at a hinge axis perpendicular to the longitudinal axis, allowing the second housing to rotate about the hinge axis in a first direction relative to the first housing from a first position parallel to the longitudinal axis of the first housing to a second position perpendicular to the longitudinal axis of the first housing, and in a second direction relative to the first housing, opposite the first direction, from the first position to a third position perpendicular to the longitudinal axis of the first housing.

* * * * *